US006192376B1

(12) United States Patent
Kincaid et al.

(10) Patent No.: US 6,192,376 B1
(45) Date of Patent: Feb. 20, 2001

(54) METHOD AND APPARATUS FOR SHADOWING A HIERARCHICAL FILE SYSTEM INDEX STRUCTURE TO ENABLE ERROR RECOVERY

(75) Inventors: W. James Kincaid, Pebble Beach; David Levish; Thomas A. Mahon, both of San Jose, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/191,172

(22) Filed: Nov. 13, 1998

(51) Int. Cl.[7] .................................................. G06F 17/30
(52) U.S. Cl. ........................................ 707/202; 702/204
(58) Field of Search ................................... 707/202, 204; 714/15, 16, 20

(56) References Cited

U.S. PATENT DOCUMENTS

| | | | | |
|---|---|---|---|---|
| 4,853,843 | * | 8/1989 | Ecklund | 707/203 |
| 5,537,592 | | 7/1996 | King et al. | 707/200 |
| 5,638,509 | | 6/1997 | Dunphy et al. | 714/20 |
| 5,664,186 | | 9/1997 | Bennett et al. | 707/204 |
| 5,706,510 | * | 1/1998 | Burgoon | 707/203 |
| 5,715,441 | | 2/1998 | Atkinson et al. | 707/1 |
| 5,717,921 | * | 2/1998 | Lomet et al. | 707/100 |

* cited by examiner

*Primary Examiner*—Paul V. Kulik
(74) *Attorney, Agent, or Firm*—Ohlandt, Greeley, Ruggiero & Perle, L.L.P.

(57) ABSTRACT

The method of the invention updates a tree arranged index for an hierarchical file system (HFS). The index includes at least one index value, i.e., an index page, that is logically positioned between an index anchor value and a sequence page. The sequence page includes actual index data. Logical positioning of the index page is determined by one or more pointers. The method initially responds to an index update request by making an update "shadow" copy of (i) a sequence page and (ii) any other index pages, up to and including a root page, that are to be updated in accord with the update request. Thereafter, an index manager updates the shadow copy of the sequence page in accord with the update request. The index manager further updates the root page and each shadowed index page that is present in a path to the updated sequence page to indicate that the path has been updated and includes the most current data. If a cancel or error indication occurs prior to updating of the index path, the shadowed copies of the sequence page, index page and root page are released, enabling the system to return to the non-updated pages. Otherwise, the index manager updates the index anchor value to point to the updated root page, thereby indicating that the index update has been successfully accomplished. Periodically, the new index anchor value, sequence page, index and root pages are written to disk.

10 Claims, 3 Drawing Sheets

METHOD AND APPARATUS FOR SHADOWING A HIERARCHICAL FILE SYSTEM INDEX STRUCTURE TO ENABLE ERROR RECOVERY

FIELD OF THE INVENTION

This invention relates to data processing systems which utilize hierarchically arranged file systems to facilitate data access and, more particularly, to a method and apparatus for assuring an ability to recover in the event of an error during update of an index to a hierarchical file system.

BACKGROUND OF THE INVENTION

A hierarchical file system (HFS) is utilized by many computational systems to enable ready-access to individual files within a large file system. Such systems may include thousands to tens of thousands of files and the search time for any file may become quite large if a linear search technique is utilized through respective addresses. By using a hierarchical index, the search procedure is greatly speeded, allowing rapid access to a desired file.

FIG. 1 illustrates the logical structure of an HFS index array which provides a means for moving from an anchor point 10, through a root page 12 and down through various levels of index pages 14, 16, 18 to a desired record 20. An HFS has between two and many indexes. Each index can be logically viewed as a data structure, commonly called a B-tree. In such a tree, there is one root node 12 that may change in the course of normal updates. Root node 12 may be an only page in the index or may point to other pages, as is most often the case. Any page that points to another page (or pages) is hereafter called an "index" page. Any page that does not point to another page is hereafter called a "sequence" page. A sequence page (e.g., 20) resides at the "end" of a series of pointers within the index and contains the actual data being sought.

During operation of an application program, index updates are required on a continuing basis. An HFS index must be atomically updated to preserve its integrity. Further, if a cancel or other interruption occurs during the course of an update or between two update requests, the system must preserve any prior changes that have been made. Normally, in current implementations of shadowed index operations, each individual update results in a corresponding input/output operation to "harden" the new index data. This avoids the complications of providing code to recover in the case of an error. However, because of the large number of updates which occur during operation of an application program, writes to disk of index changes are often delayed until a period of time has passed, during which a number of updates to the index can occur. At such time, all updates are then written to disk. Until that time, the changed index values/control blocks are maintained in virtual storage.

By delaying the hardening of such index updates to disk, system performance is substantially improved as a result of the decrease in number of time-consuming disk input/output actions that are required. However, by maintaining such changed index records in volatile memory, controls must be implemented to assure a system/data recovery capability in the event of an error or cancel action.

As will be hereafter understood, an index is a key-ordered file of unique index records. The B-tree which is utilized to implement an HFS is divided into two entities, an index set and a sequence set. As shown in FIG. 1, the pages at the lowest level of a B-tree are collectively called the sequence set and contain the actual index records. The higher levels are collectively called the index set and consist of routing nodes (or "pages"). A routing node is a special kind of index record which contains an index key and a pointer to an index page in a next lower level of the same B-tree, i.e., a "down-pointer".

Each index includes a set of attributes which a caller provides when the index is created. These attributes are used to manage the index for the caller. The attributes identify the index and describe the characteristics of the index. A name directory includes pointers to metadata in the attribute data. Metadata is information which identifies a file size, where to find the file, and other characteristics of the file that are required for its access.

To search a hierarchical index, an anchor point 10 indicates the initial point of entry which is root page 12. The root page contains a down pointer to a next lower level index page. The down pointers are followed until the sequence set is reached, at which point, the actual index data can be found. The index manager maintains the integrity of the index throughout the update operation, until the shadow copy is hardened to disk.

In order to enable recovery of data in the event of error or interrupt, the prior art has utilized a method of making mirrored or shadowed copies of user data files. Such a system is disclosed in U.S. Pat. No. 5,638,509 to Dunphy et al. wherein an index of all data file activity on a computer system is maintained and copies of data files are made so as to enable a user to recreate the state of the computer system at any selected point in time. A data file monitor intercepts all communications between an application and the file system to obtain data file status and activity information. This information is used to identify data files which are transmitted to backup media for storage, along with directory information to be used to later locate and retrieve such data files. Such systems require continued accesses to the back-up media which inhibits system throughput capabilities.

U.S. Pat. 5,664,186 to Bennett et al. describes a file management and backup system, wherein a copy of a file or file system is logically frozen in time while a backup is made. The central idea described in Bennett et al. patent is that a backup copy is made, either to disk or tape, while allowing continued access and updates to the object being backed up. U.S. Pat. No. 5,706,510 to Burgoon describes a system for management of files in a shared file system. During an update of a file, a user obtains a writable copy of a file. When an edited file is entered into a history of the managed file system, a read-only copy of the file remains on the user's disk. When the user updates the file system, the read-only file copy may be replaced with a link which enables access to a current version of the shared file. Rather than viewing a current version of a shared file, the user may wish to maintain a tatic file version by maintaining a link thereto.

It is an object of this invention to provide an improved method and apparatus for enabling a deferral of writing of index data to disk so as to reduce the number of disk I/O's.

It is another object of this invention to provide a method and apparatus for updating index data, while deferring its writing-to-disk, and at the same time, enabling error recovery and cancel protection for any index update that is in process.

SUMMARY OF THE INVENTION

The method of the invention updates a tree arranged index for an hierarchical file system (HFS) The index includes at least one index value, i.e., an index page, that is logically positioned between an index anchor value and a sequence page. The sequence page includes actual index data. Logical positioning of the index page is determined by one or more pointers. The method initially responds to an index update request by making an update "shadow" copy of (i) a sequence page and (ii) any other index pages, up to and including a root page, that are to be updated in accord with the update request. Thereafter, an index manager updates the shadow copy of the sequence page in accord with the update request. The index manager further updates the root page and each shadowed index page that is present in a path to the updated sequence page to indicate that the path has been updated and includes the most current data. If a cancel or error indication occurs prior to updating of the index path, the shadowed copies of the sequence page, index page and root page are released, enabling the system to return to the non-updated pages. Otherwise, the index manager updates the index anchor value to point to the updated root page, thereby indicating that the index update has been successfully accomplished. Periodically, the new index anchor value, sequence page, index and root pages are written to disk.

DETAILED DESCRIPTION OF THE INVENTION

Figure 1:
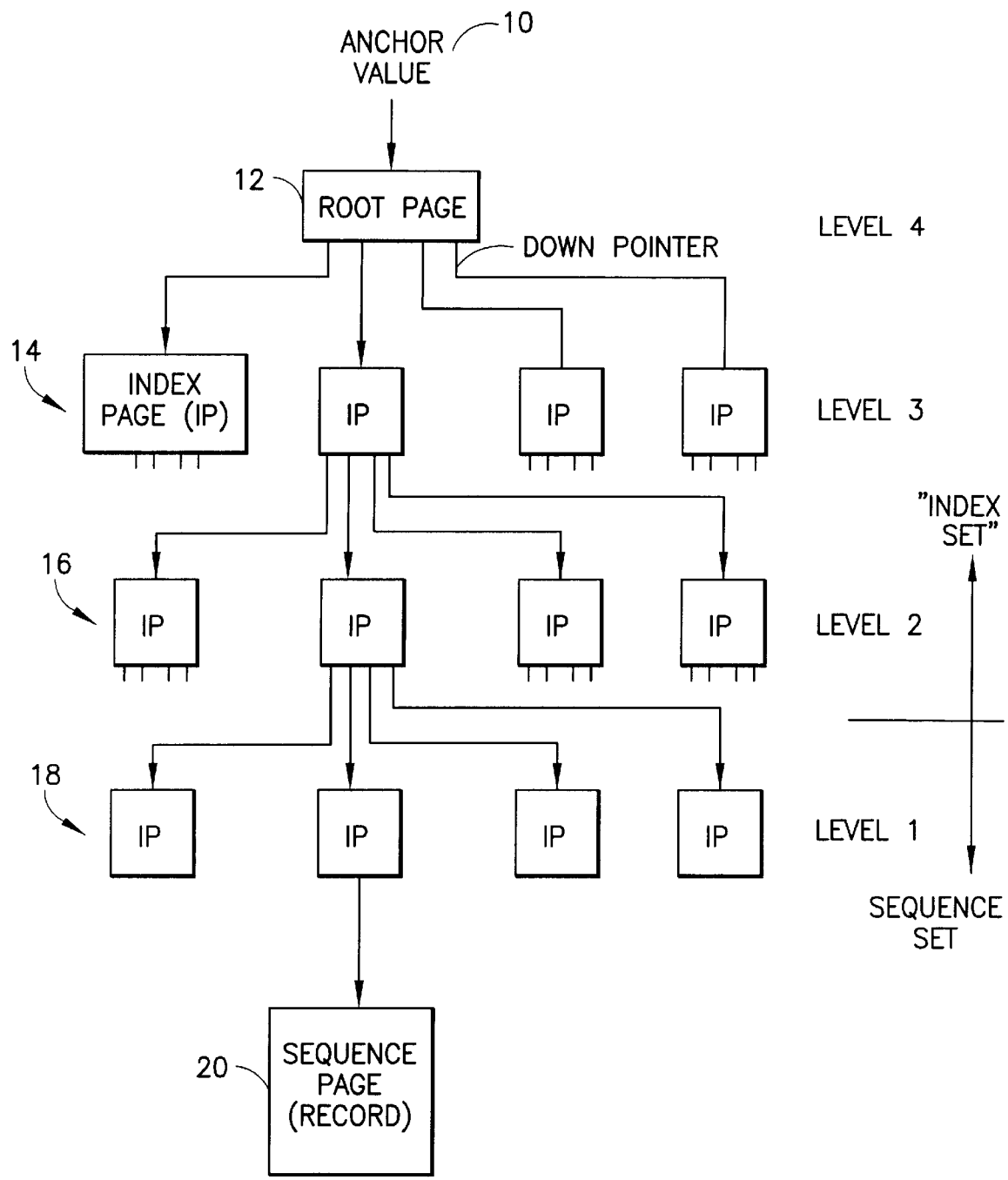
FIG. 1 is a schematic diagram illustrating the logical arrangement of an anchor value, a root page, index pages and one or more sequence pages in an index structure for a hierarchical file system.

As indicated above, FIG. 1 illustrates, logically, the arrangement of a multi-level index system that enables access to a user's index record. As indicated above, the index system comprises an anchor value 10 which includes a pointer to a root page 12, from which further index level pointers emanate. Anchor value 10, as is known, is generally written in the first data block of a disk track and provides an entry into the multi-level index structure. Root page 12 includes one or more down pointers which point to various index pages (IPs) 14. Each IP 14 includes a further down pointer to a next level of index pages 16 which in turn contain down pointers to still a further level of index pages 18.

Each index page 18, assuming a four-level index structure, includes a pointer to a sequence page that includes a user's index record. It is to be understood that the number of levels shown in FIG. 1 is merely for exemplary purposes and that other multiple level index structures are also contemplated within the scope of the invention. Further, each index page may have a variable number of pointers and a sequence page may include a variable number of records (only one being described in the example considered below).

As indicated above, during the course of operation of a computer which contains a multi-level index structure, many revisions occur of the various index pages and sequence pages. The update action occurs after the relevant index records have been written into random access memory from a disk file where they are maintained. In general, each time a revision to the index structure occurs, each of the index pages, the root page and the sequence page which lie on a path between the anchor value and the sequence page are updated to indicate that they are not synchronous with the index data on disk.

If the index pages were to be written back to disk after each update action, the number of input/output actions required of the processing system would greatly increase and would, accordingly, impact the performance of the computer. Thus, in this invention, writes of updated index sequence pages and root pages back to disk (i.e., a "hardening" of the records) are carried out on an interval basis (e.g., once every 60 seconds) or by explicit request of the application. At such time, all index records which have been updated are written to disk at a single time, thereby substantially reducing the number of I/O operations. It should be noted that the root is written last to insure the integrity of the index during the I/O write operation.

To prevent a loss of index records which might result from a cancel or error indication, the invention provides a shadowing action wherein copies are made of each root page, index page and sequence page to be updated, and the copies are subjected to the update action, all while the original non-updated root, index and sequence pages are maintained in RAM.

Figure 2:
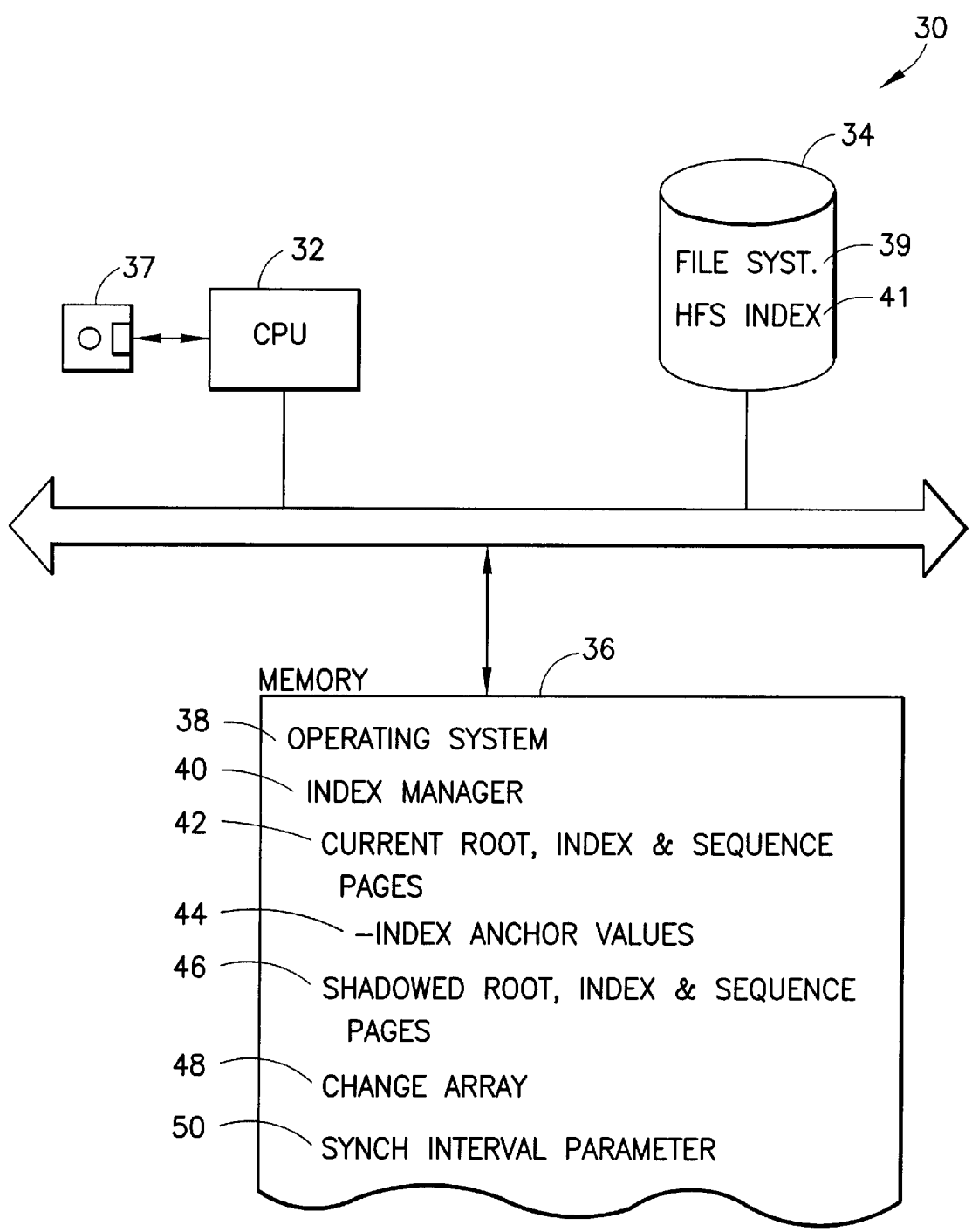
FIG. 2 is a high level block diagram of a system adapted to carry out the method of the invention.

The operation of the invention will be better understood by referring to FIG. 2 wherein computer 30 includes a central processing unit 32 and a disk drive (or disk drives) 34. A random access memory (RAM) 36 is schematically shown as containing a plurality of software/firmware procedures that collectively enable operation of the invention by CPU 32 and disk drive 34. Further, while it will be hereafter assumed that each of the procedures shown is already loaded into RAM 36, these procedures can be maintained on one or more media disks 37 and written into CPU 32 (and RAM 36) on an as-needed basis.

RAM 36 maintains operating system 38 which, in the known manner, controls the overall operation of CPU 32 and disk file 34. Within disk drive 34 is a file system 39 which is arranged in a hierarchical manner and is accessed via a hierarchical index system 41. The index system 41 is supervised by index manager 40 and includes current copies 42 of root, index and sequence pages that are selectively written into RAM 36 from disk file 34, on an as-needed basis. Also managed by index manager 40 is a set 44 of index anchor values which provide the initial starting points for each individual series of root, index and sequence pages. Memory 36 further includes a synch interval parameter 50 which identifies the interval between writes to disk of the updated index pages.

During an index update, shadowed copies are made of root, index and sequence pages to prepare for an update action, in response to an update request. Thereafter, index manager 40 updates the shadowed pages, as required, leaving the current root, index and sequence pages unchanged. During the course of updating the shadowed pages, index manager 40 constructs a change array which includes pointers to each original page and the corresponding shadowed page, the relative page numbers of the pages and virtual storage addresses of the pages within RAM 36. It will be recalled that data is stored, using virtual addresses that are configured in the form of disk track addresses.

If any further changes are requested to be made to a set of shadowed root, index and sequence pages that have already been updated, the data contained in change array 48 is employed to access the updated pages so that the further change can be entered therein. Since each of the updated root, index and sequence pages has already been marked as changed (in the hierarchy that includes a page that is to be changed again), no other pages need to be accessed. Once the change is accomplished to the accessed page, change array 48 is updated to point to the newly changed page and the old page is released for reuse.

Once a sequence page is updated in accordance with an update request, each of the other pages in the hierarchy including the root page and the sequence page must be updated to indicate the changed status of the sequence page. Accordingly, if a search is made of the index file for data in a sequence page, the search facility undertakes to first search the index hierarchies that are maintained in RAM 36 (and have not yet been written to disk). There the search facility selects the index hierarchy that is marked as changed, rather than an index hierarchy that is written on disk 34. The change indications prevent an outdated set of index pages from being accessed, in lieu of a most recently set of updated index pages.

Figure 3:
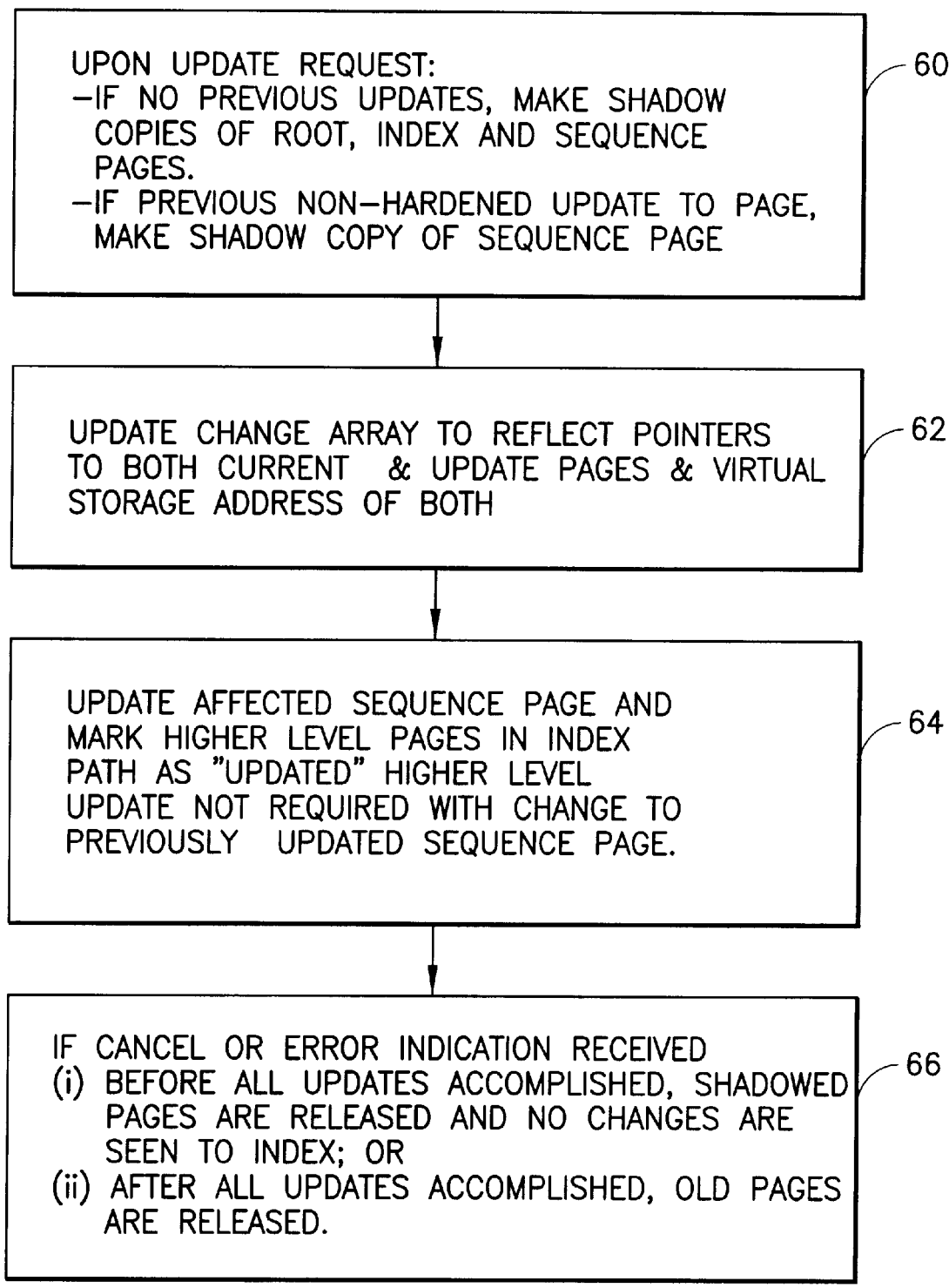
FIG. 3 is a logical flow diagram illustrating the method of the invention.

Turning to FIG. 3, the procedure of the invention will be further described. As shown in step 60, upon receipt of an update request, index manager 40 can proceed along two separate paths. First, if no previous updates have been made to a sequence page and the index and root pages which form a path thereto, shadow copies of each of the aforesaid pages are made. By contrast, if as described above, an update has been made to a sequence page (in shadowed form), change array 48 is accessed and a further shadowed copy of the sequence page to be updated is created. Thereafter (step 62) change array 48 is updated to reflect pointers which indicate both current and updated shadowed pages and the virtual storage addresses of both.

Next, the affected sequence page that has been shadowed is updated and each of the higher level index pages in the index pathway are updated to indicate the changed status of the sequence page. As regards a second or further change to a previously shadowed, updated sequence page, no changes are required to the higher level pages in the index pathway as they are already marked to indicate the changed status of the sequence page (step 64).

If a cancel or error indication is received before all of the updates are accomplished, the shadowed pages are released and no changes are seen to the index structure, recalling that all of the current root, index and sequence pages remain in virtual storage. If the cancel or error indication is received after all of the updates are accomplished, only the old (non-updated) index, root and sequence pages are released (step 66) as the remainder of the update action is complete.

Thereafter, the anchor value which points to the shadowed root page that has already been updated is altered to point to the address of the now-updated root page. At this point in time, the disk image of the index reflects the collection of changes that had heretofore been stored in RAM. When the revised index pages are written to disk, the anchor value on disk is overwritten with the new anchor value as are the changed index, root and sequence pages.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for updating a tree-arranged index to an hierarchical file system (HFS), said index including at least one index value (i.e., an index page) logically positioned between an index anchor value and a sequence page, and including a root page therebetween, said sequence page including an index record, logical positioning of an index page determined by one or more pointers, said method comprising the steps of:

a) responding to an index update request by making an update shadow copy of (i) a sequence page to be updated and (ii) any other index pages, up to and including said root page;

b) updating said shadow copy of said sequence page in accord with said update request;

c) updating said root page and each shadowed index page, in a path to said updated, shadowed sequence page, that reside in successive index levels and collectively comprise a path thereto;

d) if a cancel or error indication occurs prior to step c), releasing shadowed copies of said sequence page, each index page and root page; or e) to otherwise updating said index anchor value to point to said updated root page.

2. The method as recited in claim 1, wherein step c) updates said root page and index page(s) by marking a changed status therein.

3. The method as recited in claim 1, wherein step b) further constructs a change array that associates each shadowed, updated index page with a corresponding current index page.

4. The method as recited in claim 3, wherein step b) further causes said change array to include virtual storage addresses of each associated shadowed, updated index page and corresponding current index page, to enable access to said corresponding current index page, said method comprising the further steps of:

f) responding to a change request to a shadowed, updated sequence page, by using said change array to access said shadowed, updated sequence page;

g) updating said shadowed, updated sequence page to reflect a further change; and h) altering a virtual storage address in said change array to point to the sequence page updated in step g).

5. The method as recited in claim 1, comprising the further step of:

f) periodically writing to disk updated copies of said shadowed sequence page and each shadowed index and root page, and freeing corresponding current index pages.

6. A memory media for controlling a processor to update a tree-arranged index to an hierarchical file system (HFS), said index including at least one index value (i.e., an index page) logically positioned between an index anchor value and a sequence page, and including a root page therebetween, said sequence page including an index record, logical positioning of an index page determined by one or more pointers, said memory media comprising:

a) means for controlling said processor to respond to an index update request by making an update shadow copy of (i) a sequence page to be updated and (ii) any other index pages, up to and including said root page;

b) means for controlling said processor to update said shadow copy of said sequence page in accord with said update request;

c) means for controlling said processor to update said root page and each shadowed index page in a path to said updated, shadowed sequence page that reside in successive index levels and collectively comprise the path thereto;

d) means for controlling said processor to respond to a cancel or error indication that occurs prior to completion of the functions performed by means c), by releasing shadowed copies of said sequence page, each index page and root page; and
e) means for controlling said processor to otherwise update said index anchor value to point to said updated root page.

7. The memory media as recited in claim 6, wherein means c) causes said processor to update said root page and index page(s) by marking a change status therein.

8. The memory media as recited in claim 6, wherein means b) further causes said processor to construct a change array that associates each shadowed, updated index page with a corresponding current index page.

9. The memory media as recited in claim 8, wherein means b) further controls said processor to cause said change array to include virtual storage addresses of each associated shadowed, updated index page and corresponding current index page, so as to enable access to said corresponding current index page, said memory media further comprising:

f) means for controlling said processor to respond to a change request to an already shadowed, updated sequence page, by using said change array to access said shadowed, updated sequence page;
g) means for controlling said processor to update said shadowed, updated page to reflect a further change; and
h) means for controlling said processor to alter a virtual storage address in said change array to point to the sequence page updated in accord with said further change.

10. The memory media as recited in claim 6, further comprising:

f) means for controlling said processor to periodically write to disk updated copies of said shadowed sequence page and each shadowed index and root page, and to free corresponding current index pages.

* * * * *